United States Patent [19]

Dunwoodie et al.

[11] 3,941,950
[45] Mar. 2, 1976

[54] TELEPHONE LINE TESTING INSTRUMENT HAVING A SUPERVISING CAPABILITY

[75] Inventors: Duane E. Dunwoodie, Los Altos; Wallace Oliver, Mountain View, both of Calif.

[73] Assignee: Wiltron Company, Palo Alto, Calif.

[22] Filed: May 4, 1973

[21] Appl. No.: 357,250

[52] U.S. Cl............ 179/175.3 R; 179/175; 307/237
[51] Int. Cl.²......................................... H04B 3/46
[58] Field of Search...... 179/175.3 R, 175.1 R, 175; 307/237

[56] References Cited
UNITED STATES PATENTS

| | | | |
|---|---|---|---|
| 2,666,099 | 1/1954 | Bonner | 179/175.3 |
| 3,143,604 | 8/1964 | Cochran et al. | 179/175.3 |
| 3,600,678 | 8/1971 | Garrett | 179/175 |
| 3,601,560 | 8/1971 | Garrett | 179/175 |
| 3,627,932 | 12/1971 | Garrett | 179/175 |
| 3,711,661 | 1/1973 | Garrett et al. | 179/175.1 R |
| 3,729,597 | 4/1973 | Garrett et al. | 179/175 |
| 3,736,386 | 5/1973 | Everton | 179/175.3 |

*Primary Examiner*—Douglas W. Olms
*Attorney, Agent, or Firm*—Limbach, Limbach & Sutton

[57] ABSTRACT

A movable telephone circuit test instrument is provided, indicators mounted thereon which show the communicating state of a telephone circuit being tested. Supervision of the circuit under test is thus provided at the same location as the tester, thereby reducing the number of persons required to carry out the test. The supervising indicating means are preferably light emitting diodes and are provided in a unique driving circuit that includes a variable conductance parallel current path for maintaining the brightness of the light emitting diode substantially constant regardless of the magnitude of current being monitored by the supervising circuits.

10 Claims, 4 Drawing Figures

TELEPHONE LINE TESTING INSTRUMENT HAVING A SUPERVISING CAPABILITY

BACKGROUND OF THE INVENTION

This invention relates generally to telephone circuit test instruments and, more particularly, to such instruments that are portable in nature and which also include telephone circuit supervising and controlling means.

The testing of telephone circuits for transmission quality is a common practice in the maintenance of a telephone system. Such testing is most often conducted in a telephone central office, both upon its own circuits and those connecting the central office with another location. A test apparatus having a test signal transmitter and a receiver permits the testing of transmission characteristics of a line by inserting the test apparatus at one end of the line and looping the other end back upon itself. The test signal transmitted by the testing apparatus travels along such a circuit to its end and back again to the test apparatus receiver where a measurement is made. A test signal transmitter can be a white noise generator, pure sine wave generator, etc., while a receiver of the test set and associated measuring circuitry detects some characteristic of the transmitted signal after passing through the communication circuit under test. A particular characteristic that is typically measured may be the loss of 1 kHz, the frequency response of the line, its echo return loss or its singing point in any one test.

Such testing apparatus, including both a transmitter and receiver, is presently manufactured in a portable configuration. It is moved around to convenient locations within a central office for testing various telephone lines. A central telephone office usually has telephone status monitoring equipment located at centralized positions within the office. The result is that a technician using such a test set cannot be sure of the communication status of the line that he is testing unless he happens to be physically located near one of the central office test boards equipped with supervision indicators. If the testing technician is located away from such supervising stations in order to make a connection with a desired telephone line, a second technician must be employed to monitor the supervising indicators while the two technicians are in communication on some unused telephone circuit.

It is a primary object of the present invention to provide a portable telephone line testing apparatus that permits efficient and accurate telephone line testing from anywhere in a central office with reduced manpower requirements.

It is an additional object of the present invention to provide an improved telephone line supervising circuit.

SUMMARY OF THE INVENTION

These and additional objects are accomplished by the present invention where, according to one aspect thereof, a single unit portable test apparatus is provided with a desired apparatus for conducting a telephone line quality test such as a test signal transmitter or a signal receiver with associated measuring instruments or both, and additionally including circuits and associated indicators for supervising the status of a telephone circuit being tested. In one form of the invention, the test apparatus is provided with indicating lights on its panel which operate to give a visual indication of the existence and polarity of a direct current in the telephone line under test. Two visual indicators are provided, one which indicates a direct current in the telephone line under test of one polarity and another indicator which reveals when a direct current of an opposite polarity is present. Therefore, when the technician at the test set position is initiating the call in the line under test, he can first determine by reference to one indicating light whether a required circuit establishing direct current is flowing in the line and secondly can determine with reference to the second indicating light whether the opposite end completes connection with the line. According to another aspect of the invention, a third supervising light is provided on the test set panel for indicating when a remotely initiated call has caused automatic switching equipment to be connected to the line under test.

A testing system incorporating the various aspects of the present invention is available as Model 9041 Test Set that is manufactured and sold by Wiltron Company of Palo Alto, Calif., the assignee of the present application. Descriptive brochures are provided by the Wiltron Company, including the data sheet entitled, "Transmission Level and Return Loss Measuring Set — Model 9041" and the Wiltron Technical Review, Vol. II, No. 2, April 1973. These brochures are expressly incorporated herein by reference. The provision of line supervising indicator lights on the test set means that a single connection to a telephone circuit under test permits that test to be accomplished while the same technician can continuously monitor the status of that line by watching the line supervising lights. The requirement of a separate technician in another place in the central office to watch the central office supervising indicators is thus not necessary.

According to another aspect of the present invention, unique and improved supervising circuits are provided. The three visual indicators provided on the panel of the test set are each independent light emitting diodes (LED's). A supervising circuit is connected in series with a holding coil within the test set in a manner to maintain the voltage drop across a supervising circuit at a low level, to have one light for one direct current direction in the telephone circuit and the other light indicate an opposite direct current polarity and additionally to provide a substantially constant light output of the LED's over a wide range of telephone line current. A substantially constant light brightness indication of an LED is maintained by providing a current path parallel thereto that permits substantially all the current in excess of a predetermined value to pass therealong, thereby maintaining substantially constant current through the LED.

Additional objects, advantages and features of the present invention will become apparent from the following detailed description of a preferred embodiment thereof which should be taken in conjunction with the accompanying drawings.

DESCRIPTION OF THE PREFERRED EMBODIMENTS

Figure 1:
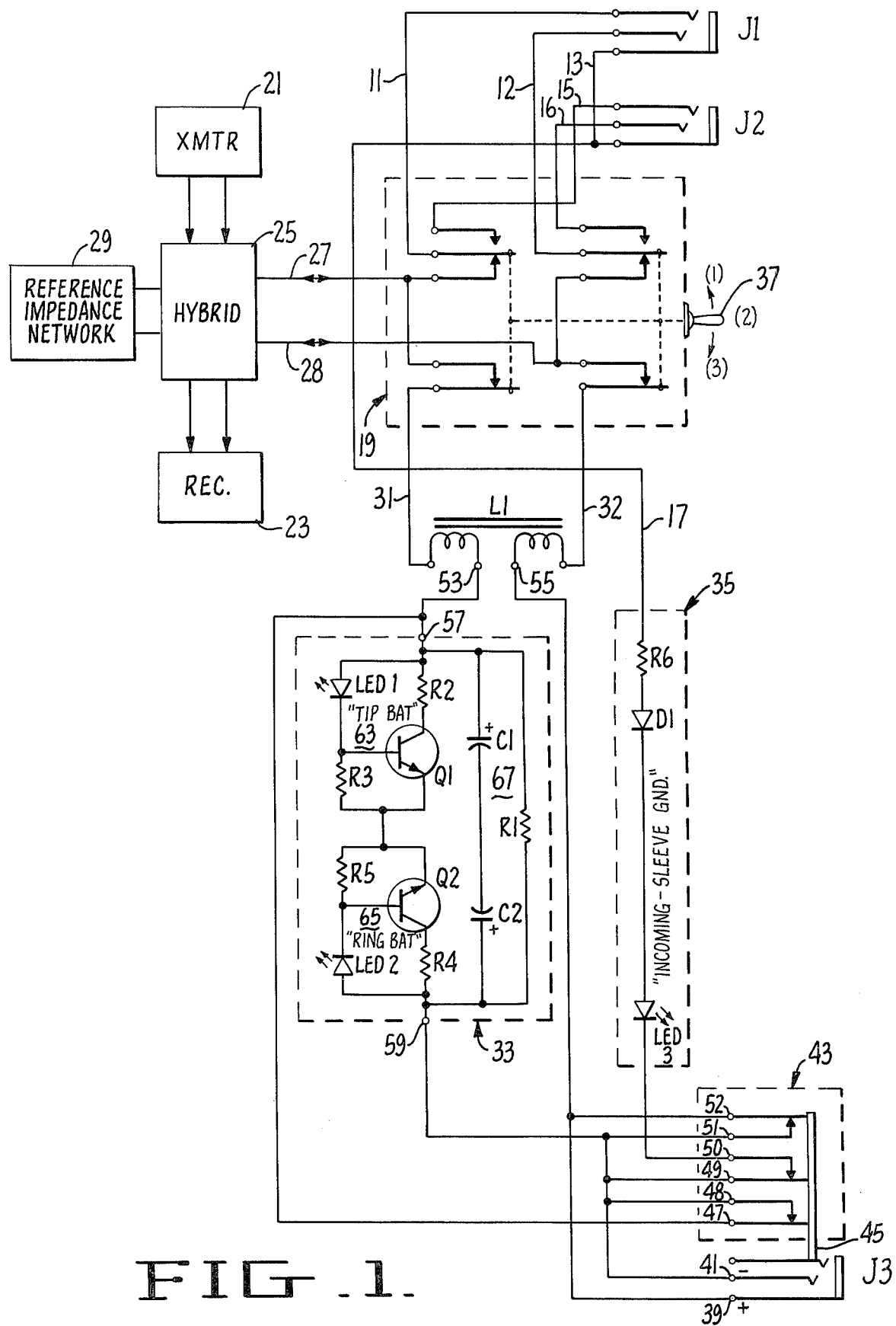
FIG. 1 is a schematic diagram of a test set including supervising and holding circuits.

All of the cooperating circuitry of FIG. 1 is preferably provided within a single test set package. A jack J1 is provided for connection to the telephone circuit or line under test. A line 11 is connected to the ring terminal of the jack J1, a line 12 connected to the tip terminal of the jack J1 and a third line 13 is connected to the sleeve terminal of the jack J1. A talk/dial input jack J2 is also provided on the test set so that the operator thereof may plug in a portable telephone for communicating or dialing over the telephone line under test that is connected to the jack J1. A conductor 15 is connected to the ring terminal of the jack J2, a conductor 16 connected to the tip terminal of the jack J2 while its sleeve is commonly connected to the line 13 and to a conductor 17. The tip and ring conductors or both of the jacks J1 and J2 are connected to a manually actuated switch 19 for controllable connection to one another and to other elements of the test set.

In order to conduct tests on a test line, the test set includes a test signal transmitter 21 and a test signal receiver 23 which are both connected through a standard hybrid circuit 25 to a two-wire line 27, 28 which extends into the switch 19. A reference impedance network 29 of a known type is also connected with the hybrid 25. For the purposes of this invention, as discussed previously, the test signal transmitter 21 can be of any desired type such as a white noise generator or a sine wave generator, that is desired to conduct a particular telephone line test. The receiver 23 is, of course, matched in type to the character of the signal generated by the test transmitter 21. Measuring circuits (not shown) connected as part of the receiver 23 may include an analog meter, a digital meter, a graph recording system, selective filter circuits, etc., depending upon the particular application requirements of the test set.

A fourth pair of conductors 31 and 32 are connected to the manual switch 19 for providing interconnection with a telephone line and holding and supervising circuits. The holding and supervising circuits include a holding coil L1, a local battery jack J3 provided for access external of the test set, a first supervising circuit 33 and a second supervising circuit 35.

The switch 19 has three stable positions which are selected by a panel mounted switch handle 37. A talk/dial switch position (1) connects the lines 11, 12 from the telephone line connection jack J1 to the talk/dial jack J2 while maintaining the other two pair of lines 27, 28 and 31, 32 disconnected from the telephone line jack wires 11, 12. In this position (1) the operator is permitted to dial and communicate along the telephone circuit under test by means of a dial head set or other portable telephone equipment which is plugged into the jack J2.

When the switch 19 is in a hold position (2), the lines 31, 32 of the holding and supervising circuits and the lines 27, 28 from the testing transmitter and receiver are both connected to the telephone line jack lines 11, 12. The jack J2 is then disconnected from the telephone line. In the hold position (2) of the handle 37 of the switch 19, the test set is connected to hold the telephone line under test in a communicating state and also to connect the transmitter 21 and receiver 23 to the telephone line. It is this hold position (2) which is utilized during the testing and measuring of the telephone circuit.

A position (3) of the handle 37 of the switch 19 opens the telephone line under test by disconnecting the holding circuit lines 31, 32 therefrom. In this open position (3), only the lines 27, 28 are connected to the telephone line jack lines 11, 12. Without a holding circuit applied to the telephone line under test, the circuit established thereon is broken. This open position (3) is used by a technician after a test is completed.

The local battery jack J3 includes a terminal 39 connected to the sleeve of the jack for receiving the positive voltage terminal of the battery. A terminal 41 of the jack J3 receives the negative potential of the battery when connected to the jack J3. Associated with the jack J3 is multiple contact switch 43 operable by a mechanical element 45 that is displaced away from the jack J1 of FIG. 1 in response to the insertion in jack J3 of a plug. The rest position of the switch 43 shown in FIG. 1 is that which occurs when a plug is not inserted in the jack J3. Three terminal pairs 47, 48 and 49, 50 and 51, 52 exist as part of the switch 43. In the rest position shown in FIG. 1, only the terminal pair 51, 52 are connected together while the other two terminal pairs are open. This reverses when a plug is inserted into the jack J3.

Figure 2:
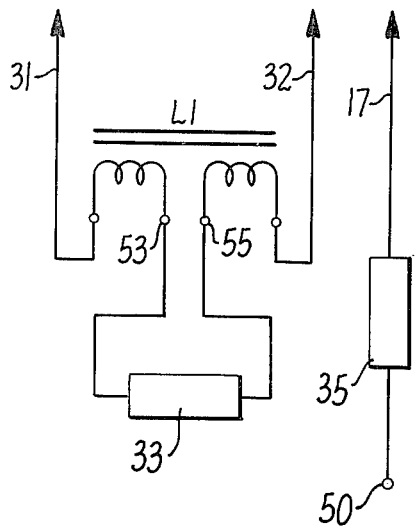
FIG. 2 is an equivalent circuit of a portion of FIG. 1 in one condition.

The elements of the telephone line holding circuit shown in FIG. 1 include a holding coil L1 having center terminals 53 and 55. When no plug is inserted into the jack J3, as shown in FIG. 1, the supervising circuit 33 is inserted in series with the two coils of the holding coil L1 by a terminal 57 being connected to the terminal 53 and a terminal 59 being connected through the contacts of terminals 51, 52 of the switch 43 back to the terminal 55 of the holding coil L. This condition is shown in an equivalent circuit of FIG. 2 which also indicates that the terminal 50 of the switch 43 is floating so that the supervising circuit 35 is inoperative. As can be seen from FIG. 2, the holding coil L1 and supervising circuit 33 are connected in series across a telephone line under test that is connected to the jack J1 when the switch 19 is in its hold position (2).

Figure 3:
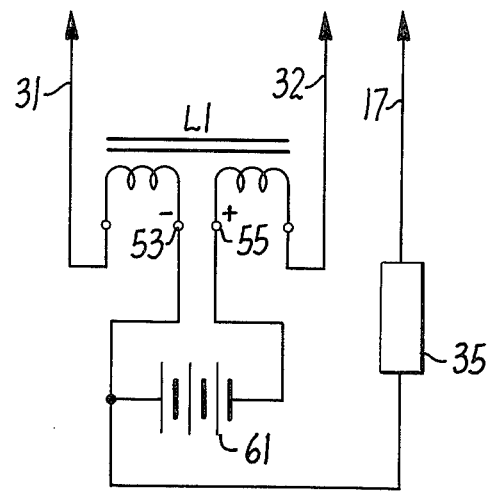
FIG. 3 is an equivalent circuit of a portion of the circuit of FIG. 1 in another condition.

When a local battery is electrically connected to the test set by insertion of a battery plug into the jack J3, the switch 43 operates in a manner to connect the elements of the circuit of FIG. 1 as shown in a simplified schematic of FIG. 3. A battery 61 is connected into the circuit in such a circumstance as well. The terminals 57 and 59 of the supervising circuit 33 are shorted together through the switch terminals 47, 48 when a battery plug is inserted in the jack J3. While the supervising circuit 33 is rendered inoperative, one side of the supervising circuit 35 is connected through terminals 49, 50 of the switch 43 to the negative terminal of the battery 61. The supervising circuit 35 is connected on its other end by way of a line 17 to the sleeve of the telephone line jack J1. A battery is so plugged in to form the circuit of FIG. 3 when a call is being originated on a telephone line under test from a location remote to that of the test set. The battery 61 is placed in series with the two coils of the holding coil L1 across a telephone line connected with the jack J1 when the switch handle 37 is in its hold position (2).

The supervising circuit 35 includes a current limiting resistor R6, a diode D1 and a light emitting diode LED3 in series between its connecting line 17 and the terminal 50 of the switch 43. When a battery plug is inserted in the jack J3, this series supervising circuit 35 is connected so that when the sleeve of a telephone line connected to the jack J1 is grounded, the light emitting diode LED3 gives a visual indication. The sleeve is so grounded by central office switching equipment when connection is made therethrough to a telephone line. When LED3 is lighted, therefore, the technician knows that a proper connection has been made through the central office switching equipment to a telephone line which is being dialed at its opposite end. The light LED3 is provided on the panel of the test set and is labeled "incoming-sleeve gnd". When operated in a condition illustrated in FIG. 3, the local battery 61 provides the holding current in the telephone line being tested.

When no local battery is connected to the jack J3, however, the supervisory circuit 33 becomes operative while the supervisory circuit 35 becomes inoperative. The supervising circuit 33 contains two light emitting diodes LED1 and LED2. Both of these indicators are mounted on the panel of the test set and are labeled respectively, "tip bat" and "ring bat". The supervisory circuit 33 is designed so that when its terminal 57 is positive with respect to its terminal 59, LED 1 lights while LED2 remains dark. Conversely, when the terminal 59 is positive with respect to the terminal 57, LED2 lights while LED1 remains dark. This thus gives the operator of the test set a direct indication as to the polarity of the direct current flowing in a telephone line under test and informs him whether the telephone line is still operable. Without this information, the technician utilizing the test set is unaware as to whether the signal being received and measured by him is passing over the telephone circuit as desired or whether a signal is travelling over some undesired and unknown electrical path. The reliability of the test results depends upon the ability of the operator to accurately verify the communication status of the line under test.

Figure 4:
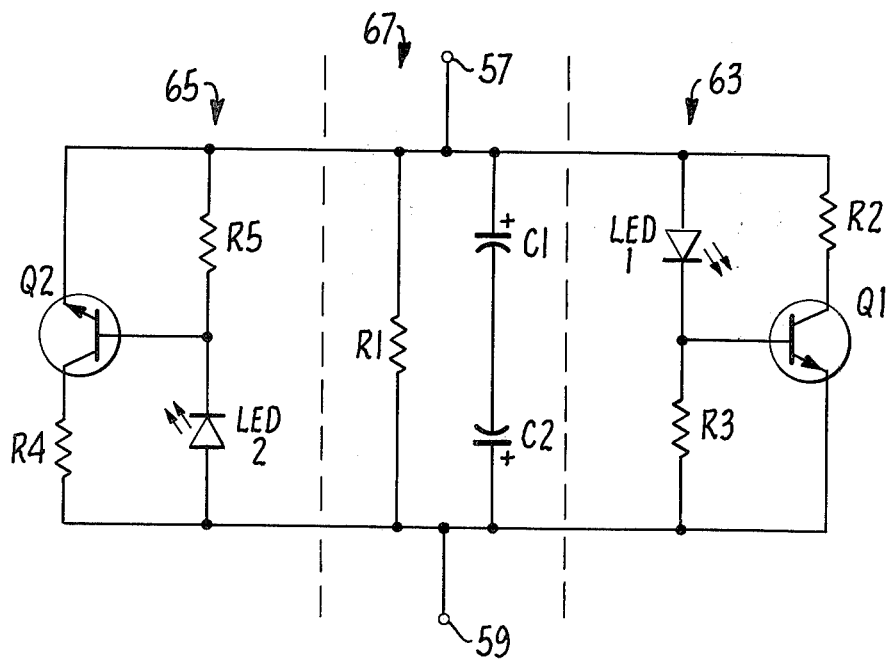
FIG. 4 shows a possible modification of a portion of the circuit diagram of FIG. 1.

The improved current monitoring circuits of the supervisory circuit 33 will now be explained in detail. The circuit 33 can be broken down into three components 63, 65 and 67. FIG. 1 shows the components 63 and 65 in a series relationship between the terminals 57 and 59. FIG. 4 shows a variation of the supervisory circuit 33 in which the components 63 and 65 are connected in parallel between the terminals 57 and 59. In either case, the operation is substantially identical the only difference being perhaps slight differences in component values between the FIG. 1 and FIG. 4 embodiments of the circuit 33. Since the function and operation of the various components of the circuit 33 in each of the FIGS. 1 and 4 are the same, they have been given the same reference characters. It should also be noted that the circuit 33 as illustrated in FIGS. 1 and 4 has general application for indicating the existence and polarity of currents from whatever source that are passed between the terminals 57 and 59.

The supervisory current indicating circuit 33 will now be explained. The series capacitors C1 and C2 provide a low impedance path for voice frequencies between the terminals 57 and 59. In addition to these capacitors, a resistance R1 is provided between the terminals 57 and 59 to complete the portion 67 of the circuit. The purpose of the resistance R1 is to provide a threshold voltage level between the terminals 57 and 59 below which an LED will not indicate, thereby requiring a substantial direct current before an indication on either LED1 or LED2 is obtained. This takes advantage of the known characteristics of light emitting diodes wherein a threshold voltage such as 1.6 volts must be impressed across a light emitting diode in its forward direction for sufficient current to flow therethrough to emit a light indication. Enough current must be flowing through R1 to produce such a voltage drop across either the LED1 or LED2, depending upon the polarity of the voltage impressed across the terminals 57 and 59.

Assume for the purposes of the following explanation that the terminal 57 is positive with respect to the terminal 59. LED2 will be back biased and will not conduct. LED1 is forward biased when current through R1 reaches a level sufficient for the voltage drop across LED1 to exceed its threshold characteristic, and current will flow through LED1 and cause it to light. A resistance R3 is connected in series with LED1 as part of the circuit portion 63. A transistor Q1 has its emitter-collector terminals connected in series with a resistance R2, the series combination being connected in parallel with LED1 and R3. The base of the transistor Q1 is connected to the common junction of the resistor R3 and LED1 so that when the voltage drop across the resistance R3 exceeds the base emitter voltage characteristic ($V_{BE}$) of the transistor Q1, current begins flowing through the series combination R2 and Q1 in parallel with the current in the path of LED1 and R3. It can be seen directly from FIG. 4 that the full voltage between the terminals 57 and 59 is applied across the circuit portion 63. In the FIG. 1 embodiment of the circuit 33, however, an additional small impedance in the form R5, a forward biased base-collector circuit of the transistor Q2 and a collector resistor R4 are connected in series with the circuit 33. With the assumed polarity, LED2 is reversed biased and no current flow therethrough.

The operation of the circuit portion 63 for the assumed polarity of the terminal 57 being positive to the terminal 59 will now be explained for various current levels. As previously mentioned, low value of currents flow through the resistor R1 when the potential created thereby across LED1 is less than its threshold. When this potential exceeds the threshold of LED1, current will flow therethrough and cause it to light. The resistance R3 is made of a value with respect to the characteristics of the transistor Q1 so that Q1 remains turned off until the current through LED1 and R3 in series reaches a certain level which is about the maximum current desired to pass through LED1. The value of R3 is chosen so that at this current level, the transistor Q1 is turned on, thus establishing the parallel current path of R2 and Q1. Further incremental increases in total current passing through the circuit nearly all travel through the R2 and Q1 path, thereby maintaining the current through LED1 substantially constant. This results when the transistor Q1 is chosen to have a high transconductance as represented by the characteristic that the very small change in the voltage drop across R3 which is applied between the base and emitter of Q1 will give very large changes in the collector current of Q1. Q1 thus accepts large incremental changes in collector current in response to very small changes in current through R3. As a result, the current through LED1 and R3 increases very little in response to a large increase in current applied to the total circuit 63. Since the light output of LED1 is a function of the current therethrough, the circuit 63 assures that for a wide range of impressed currents, the light indication is substantially the same in brightness.

The voltage drop across the circuit 63 is the sum of the $V_{BE}$ characteristic of the transistor Q1 and the forward bias (threshold) level of LED1 for a wide range of impressed currents to the circuit 33. This total voltage drop will usually be in the range of 2–3 volts. Therefore, the holding coil L1 and the rest of the circuit sees the supervisory indicating circuit 33 as a substantial short circuit. No additional voltage supply is required to light the LED's but rather the direct current existing in the telephone line under test performs this function. Furthermore, LED1 only indicates for one direction of current flow when the terminal 57 is positive with respect to the terminal 59. For the opposite case, when the terminal 59 is positive with respect to the terminal 57, the roles of the circuit components 63 and 65 are reversed from that described above since LED1 is now reversed biased and LED2 is forward biased to give a visual indication. In this case, it is the voltage drop across R5 which controls the conductive state of the transistor Q2 in the same manner described above with the resistor R3 and the current therethrough controlling the conductive state of the transistor Q1.

In a specific form of the circuit 33 shown in FIG. 1, the values of R3 and R5 are each 10 ohms while the transistors Q1 and Q2 are of a type 2N3566. Of course, other semiconductor elements, such as FET's, can be substituted for the transistors shown as Q1 and Q2. The resistance R1 in such a form is preferably about 220 ohms. The value of each of the capacitors C1 and C2 is 220 uf. The resistances R2 and R4 in a specific example are each 11 ohms, but it will be understood that in other embodiments of the circuits these resistances may be omitted. The resistances R2 and R4 are preferred in order to limit maximum collector dissipation in the embodiment of FIGS. 1 and 4. It will also be understood that the resistance R1 may be omitted if it is acceptable to light the diodes LED1 and LED2 at very low impressed currents.

Although the various aspects of the present invention have been described with respect to specific test set examples embodying them, it will be understood that the various aspects of the present invention are entitled to protection within the full scope of the appended claims.

What is claimed is:

1. A telephone test apparatus comprising in a single unit:
    a connector having at least two terminals for establishing electrical contact with a telephone circuit under test,
    means including an alternating current test signal transmitter or receiver or a cooperative combination thereof connectible to said at least said two terminals for participating in a test of the quality of a telephone circuit connected thereto,
    means having low direct current impedance but high impedance to alternating current signals for holding a telephone circuit in a communicating state, and
    electrical circuit means for supervising the communicating state of a telephone circuit under test, said supervising circuit connectible in series with said holding means across said two telephone line connector terminals, said supervising circuit including a first indicator that responds to a direct current in excess of a certain level flowing in one direction through said holding means, and a second indicator that responds to direct current in excess of a certain level flowing through said holding means in an opposite direction, whereby the communicating state of a telephone circuit under test may be monitored simultaneously with conducting a quality test thereon, both from a common location.

2. Apparatus according to claim 1 wherein each of said first and second indicators are cooperatively connected with means providing a direct current conductive path parallel to the indicator for maintaining the current through the indicator substantially constant over a wide range of current through said holding means.

3. Apparatus according to claim 1 wherein said connector additionally includes a sleeve connection and wherein the apparatus additionally inclludes a supervising circuit having a third indicating means operably connectible between the sleeve of said telephone line connector and a negative power supply terminal.

4. Apparatus according to claim 1 which additionally includes a local battery jack having a switch mechanically associated therewith that substitutes a connected battery source in series with said holding means for the first and second indicating means when a battery plug is inserted therein, thereby to establish supervision of a line at its point of origin.

5. A telephone test apparatus comprising in a single unit:
    a connector having at least two terminals for establishing electrical contact with a telephone line under test,
    means connectible to said telephone line connector for participating in a test of the quality of a telephone circuit connected thereto,
    means for holding a telephone line, and
    electrical circuit means for supervising the communicating state of a telephone line under test, said supervising circuit connectible in series with said holding means across said two telephone line connector terminals, said supervising circuit including a first light emitting diode that responds to a direct current flowing in one direction through said holding means, and a second light emitting diode that responds to direct current flowing through said holding means in an opposite direction, each of said first and second light emitting diode indicators having a resistance connected in series therewith, a semiconductor device forming a current path parallel to the light emitting diode and a connection of a control element of the semiconductor device to said series resistance in a manner that small increases in current passing through the light emitting diode causes amplified increases in current through said current path, whereby the current through the light emitting diode remains substantially constant regardless of the current in the telephone circuit under test.

6. A telephone test apparatus comprising in a single portable unit:
    a connector having at least two terminals for establishing electrical contact with a telephone line under test,
    means connectible to said telephone line connector for participating in a test of a telephone circuit connected thereto as to its quality of audio frequency transmission, means for holding a telephone line in a communicating state, and electrical circuit means for supervising the communicating state of a telephone line under test, said supervising circuit connectible in series with said holding means across said two telephone line connector terminals, said supervising circuit including a first indicator that responds to a direct current flowing in one direction through said holding means, and a second indicator that responds to direct current flowing through said holding means in an opposite direction, each of said indicators having a resistance connected in series therewith, a semiconductor device forming a current path parallel to the indicator and a connection of a control element of the semiconductor device to said series resistance in a manner that small increases in current passing through its associated indicator causes amplified increases in current through said current path, whereby the current through each indicator remains substantially constant regardless of the current in the telephone circuit under test.

7. A telephone test apparatus, comprising in a single portable unit:

a connector having at least two terminals for establishing electrical contact with a telephone circuit under test, an alternating current test signal transmitter, an alternating current test signal receiver, a hybrid circuit connectible between said receiver and transmitter and said at least two terminals of the connector, thereby providing the capability of simultaneous test signal transmimssion and reception along a telephone circuit connected to said at least two terminals, means connectible across said at least two terminals for providing an electric current path having a low impedance to direct current in both directions but having a high impedance to said alternating current signals, and means connectible in series with said current path means for indicating the presence of a direct current level above a given threshold amount that exists in said current path means.

8. A telephone test apparatus according to claim 7 wherein said current path means comprises an electromagnetic coil and wherein said indicating means includes a visual indicator.

9. The telephone test apparatus according to claim 7 wherein said current path means includes an electromagnetic coil having a center tap, and further wherein said indicating means includes a visual indicating circuit connected in series with the coil at its center tap.

10. A telephone test apparatus according to claim 9 wherein said visual indicating means includes two lights connected so that one light gives a visual indication when current through said holding coil is in one direction and the other of said indicating lights giving a visual indication when the current through said holding coil is in an opposite direction.

* * * * *